US012800380B2

(12) United States Patent
Bakker et al.

(10) Patent No.: US 12,800,380 B2
(45) Date of Patent: Nov. 17, 2026

(54) HYBRID INVENTORY MEASUREMENT SYSTEMS AND METHODS FOR TANK GAUGING

(71) Applicant: Honeywell International Inc., Charlotte, NC (US)

(72) Inventors: Frank Edo Bakker, Edam (NE); Ronald Cornelis Schrier, Delft (NE); Dirk van Duijn, Katwijk (NE)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 517 days.

(21) Appl. No.: 18/369,130

(22) Filed: Sep. 15, 2023

(65) Prior Publication Data

US 2025/0093195 A1 Mar. 20, 2025

(51) Int. Cl.
*G01F 23/80* (2022.01)
*G01F 23/18* (2006.01)

(52) U.S. Cl.
CPC ............ *G01F 23/804* (2022.01); *G01F 23/18* (2013.01)

(58) Field of Classification Search
CPC ........ G01F 23/804; G01F 23/18; G01F 23/14; G01F 23/296; G01F 23/802
See application file for complete search history.

(56) References Cited

U.S. PATENT DOCUMENTS 4,748,846 A 6/1988 Haynes
6,157,894 A * 12/2000 Hess ...................... G01F 23/18 702/50
7,539,593 B2 5/2009 Machacek
9,329,073 B2 5/2016 Sai
9,476,787 B1 10/2016 Westmoreland et al.
2009/0282892 A1 11/2009 Sai
2021/0010849 A1* 1/2021 Laws ...................... G01F 1/007

FOREIGN PATENT DOCUMENTS

EP 4116690 A1 * 1/2023 ............... G01N 9/00
WO WO-9205408 A1 * 4/1992 ............ G01F 23/14

OTHER PUBLICATIONS

"Radar Tank Gauging," https://instrumentationtools.com/radar-tank-gauging/, downloaded Jul. 2, 2023.
"Storage Tank Measurement, Servo Gauges," Ch-IN-4416.043-V-2.1.
"The art of tank gauging," Enraf.

(Continued)

*Primary Examiner* — Jennifer Bahls
(74) *Attorney, Agent, or Firm* — Ingrassia Fisher & Lorenz

(57) ABSTRACT

A method, system and apparatus for tank gauging involves calculating a first mass of a product in a tank using data indicative of a first condition and calculating a second mass of the product in the tank using data indicative of a second condition, wherein the data indicative of the first condition is collected independently of the data indicative of the second condition and reporting a tank mass of the product in the tank based on a comparison of the first mass to the second mass. In some embodiments, the first mass can be calculated based on data obtained from a Hybrid Inventory Measurement System (HIMS) and the second mass can be calculated based on data obtained from a level gauging system.

12 Claims, 3 Drawing Sheets

(56) References Cited

OTHER PUBLICATIONS

"Enraf Smart Servo 954, Industry's Best Servo Gauge is Now Even Better," 2019, Honeywell International Inc.
'Enraf Smartradar Flexline, Precise, Reliable, Safe Tank Measurement', 2019 Honeywell International Inc.
"Vito MPT Temperature Probe, Honeywell Enraf," 2013 Honeywell International Inc.
"Enraf Tank Temperature Measurement," Honeywell, https://process.honeywell.com/us/en/products/terminals/enraf-tank-gauging/enraf-tank-temperature-measurement, downloaded Jul. 5, 2023.
"Vito LT", 2015, Honeywell International Inc.
"Smartline Pressure Transmitters," 2023, Honeywell International Inc.

* cited by examiner

HYBRID INVENTORY MEASUREMENT SYSTEMS AND METHODS FOR TANK GAUGING

TECHNICAL FIELD

Embodiments are generally related to liquid measurement systems. Embodiments further relate to sensors including level sensors, density sensors, temperature sensors and pressure sensors used in the monitoring of liquids and other products stored in tanks in industrial processes. Embodiments further relate to the field of tank gauging.

BACKGROUND

Level measurement systems and devices play a crucial role in industrial applications, especially when it comes to measuring the conditions (e.g., level, density, mass, etc.) of liquids like hydrocarbons in tanks during various industrial processes. These systems and related devices are important for a number of reasons. For example, accurate level measurement allows for better process optimization. By knowing the exact level of liquid in a tank, operators can ensure that the right amount of material is present for efficient operation. This knowledge helps in maintaining proper inventory control, avoiding overflows or runouts, and optimizing production rates.

Furthermore, incorrect level measurements can lead to hazardous situations. If the level exceeds the capacity of a tank, it may result in spills, leaks, or even explosions. On the other hand, running a process with insufficient liquid can cause equipment damage or pose risks to personnel. Reliable level measurement systems help prevent such accidents and protect the environment.

Liquid levels in industrial processes often correspond to valuable resources. Accurate level measurement enables efficient resource management by monitoring and controlling the amount of material used. This helps reduce waste, optimize production costs, and ensure the availability of materials when needed.

Level measurements serve as important input variables for process control systems. By continuously monitoring the level, these systems can automatically regulate the flow of liquids, maintain desired levels, and trigger appropriate actions like opening/closing valves or activating pumps. This ensures consistent operation and reduces the need for manual intervention.

In certain processes, maintaining a specific liquid level can be critical to ensuring product quality. For example, in chemical or pharmaceutical industries, precise levels of ingredients are necessary to achieve desired formulations. Accurate level measurement helps maintain batch consistency, product quality, and adherence to regulatory requirements.

Level measurement systems provide valuable data for maintenance and troubleshooting purposes. By monitoring levels over time, operators can detect abnormalities, identify potential equipment malfunctions, and schedule maintenance activities proactively. This helps minimize downtime, increase equipment lifespan, and optimize maintenance costs.

In many industrial applications, tanks and processes may be located in remote or hazardous areas. Level measurement devices equipped with advanced communication technologies allow for remote monitoring and control. Operators can access real-time data, make informed decisions, and respond promptly to any issues, improving overall efficiency and safety.

Level measurement systems and devices are therefore vital in industrial applications, including measuring the level of liquids like hydrocarbons in tanks. They contribute to process optimization, safety, resource management, process control, quality assurance, maintenance, and remote monitoring. Accurate level measurements ensure efficient and safe operations, minimize risks, and support the overall productivity and profitability of industrial processes.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for improved liquid measurements methods and systems.

It is another aspect of the embodiments to provide for an improved tank gauging method and system.

It is also an aspect of the embodiments to provide for a hybrid tank gauging solution.

The aforementioned aspects and other objectives can now be achieved as described herein. In an embodiment, a method for tank gauging, can involve calculating a first mass of a product in a tank using data indicative of a first condition and calculating a second mass of the product in the tank using data indicative of a second condition, wherein the data indicative of the first condition is collected independently of the data indicative of the second condition; and reporting a tank mass of the product in the tank based on a comparison of the first mass to the second mass.

In an embodiment, reporting of the tank mass of the product in the tank based on the comparison of the first mass to the second mass, can further involve: reporting the tank mass when a result of the comparison is within a required uncertainty between the first mass and the second mass.

An embodiment can further involve reporting a service issue when a result of the comparison is not within a required uncertainty between the first mass and the second mass.

In an embodiment, the data indicative of the first condition of the product in the tank can include pressure data.

In an embodiment, the data indicative of the first condition of the product in the tank can include a hydrostatic pressure.

In an embodiment, the data indicative of the first condition of the product in the tank can include a level of the product in the tank.

In an embodiment, the data indicative of the first condition of the product in the tank can include density and/or temperature.

An embodiment can further involve: measuring the first condition in the tank using a first sensor and providing data indicative of the first condition from the first sensor; and measuring the second condition in the tank using a second sensor that is independent of the first sensor, wherein the second sensor provides data indicative of the second condition.

In an embodiment, the first sensor can be a hydrostatic pressure sensor.

In an embodiment, the second sensor can comprise a level sensor for measuring a level of the product in the tank.

In an embodiment, the first mass can be calculated based on data obtained from a Hybrid Inventory Measurement System (HIMS) and the second mass can be calculated based on data obtained from a level gauging system.

BRIEF DESCRIPTION OF THE DRAWINGS

The accompanying figures, in which like reference numerals refer to identical or functionally similar elements throughout the separate views and which are incorporated in and form a part of the specification, further illustrate the embodiments and, together with the detailed description, serve to explain the principles of the embodiments.

Identical or similar parts or elements in the figures may be indicated by the same reference numerals.

DETAILED DESCRIPTION

Figure 1:
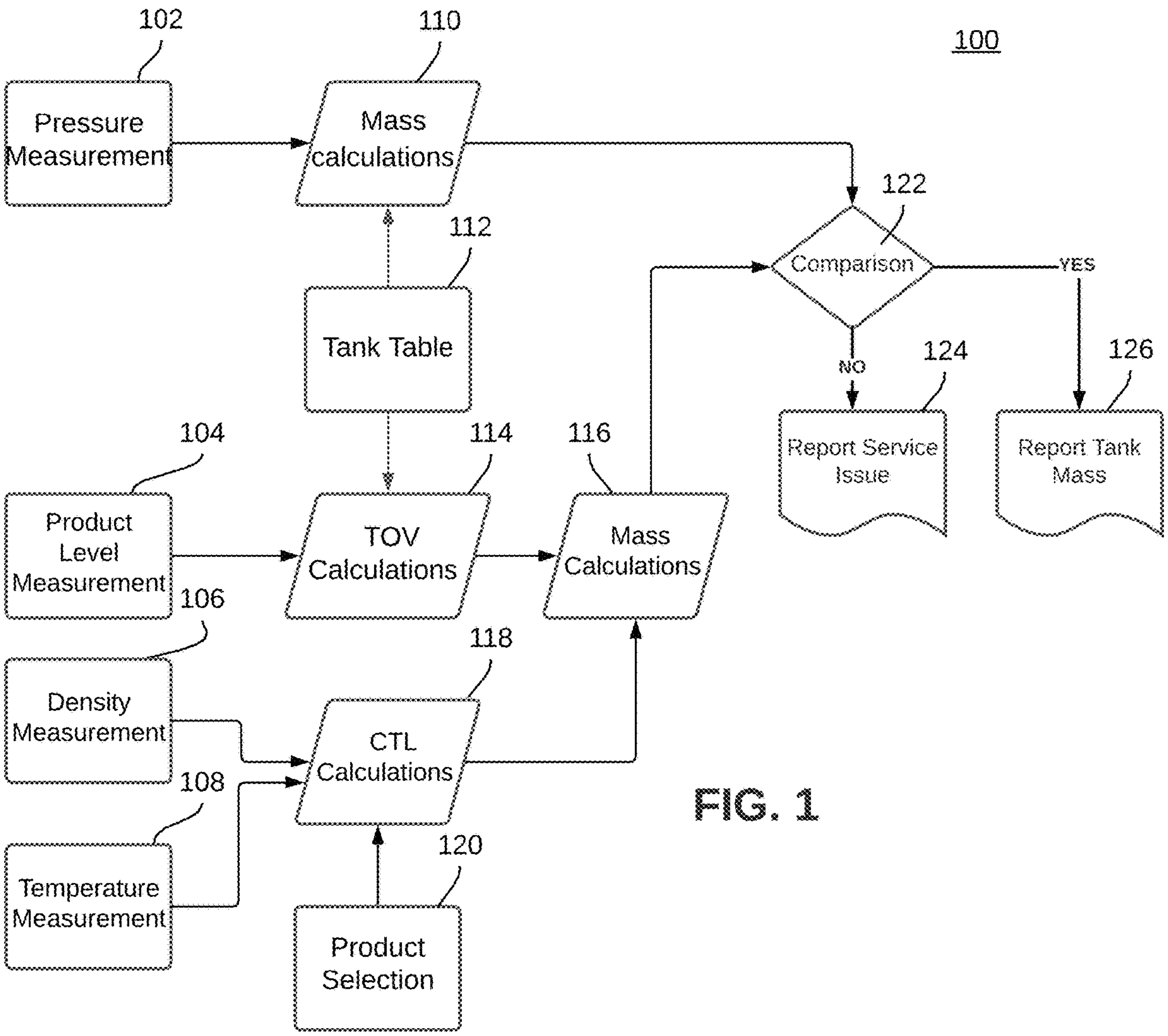
FIG. 1 illustrates a flow chart of operations depicting logical operational steps for implementing a tank gauging method, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in an embodiment" or "in one embodiment" or "in an example embodiment" and variations thereof as utilized herein may or may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. Furthermore, the term "at least one" as used herein, may refer to "one or more." For example, "at least one widget" may refer to "one or more widgets."

In addition, the term "based on" may be understood as not necessarily intended to convey an exclusive set of factors and may, instead, allow for existence of additional factors not necessarily expressly described, again, depending at least in part on context.

Figure 2:
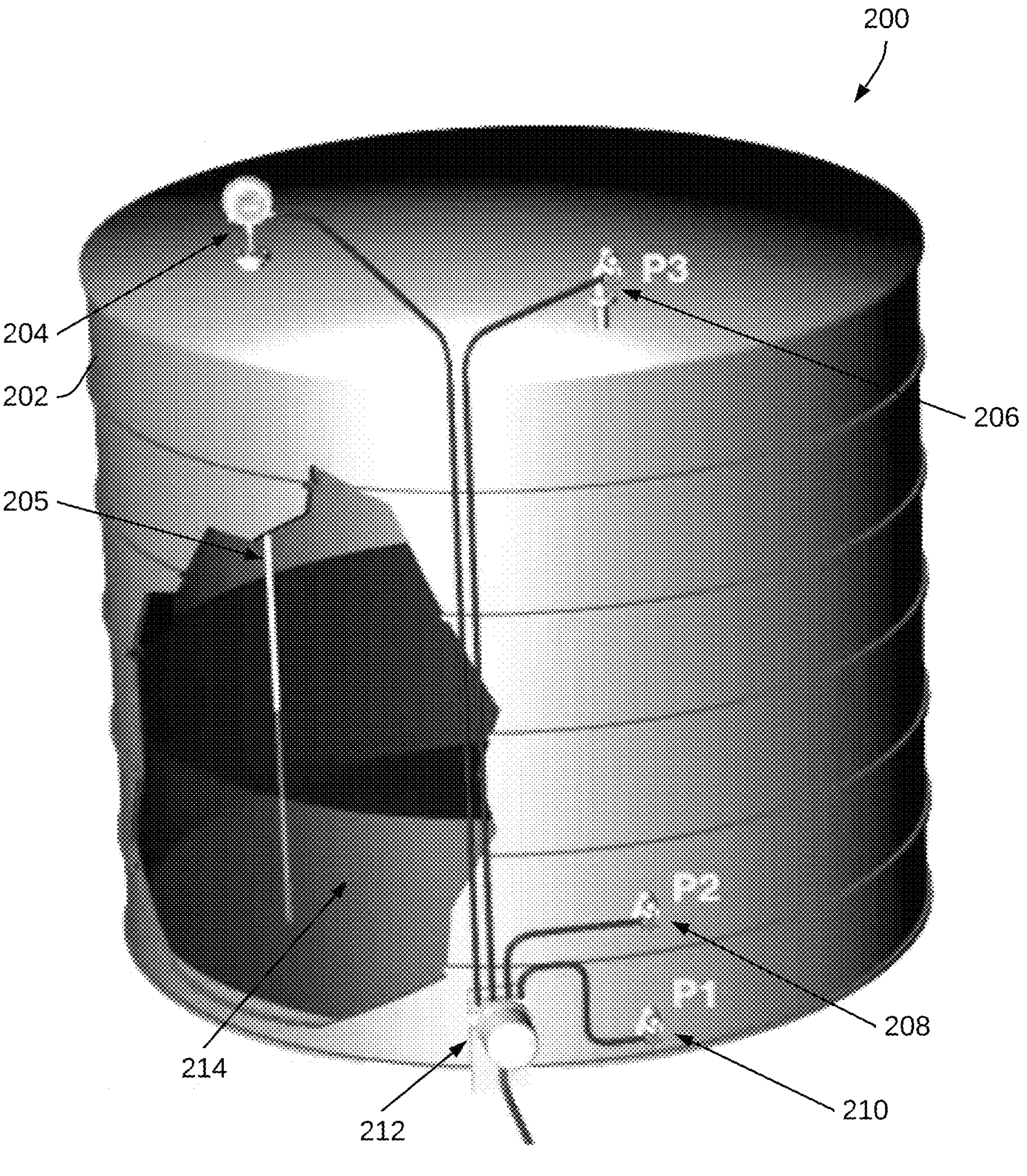
FIG. 2 illustrates a schematic diagram of a tank gauging system, which can be adapted for use in accordance with an embodiment.

FIG. 1 illustrates a flow chart of operations depicting logical operational steps of a method 100 for tank gauging, in accordance with an embodiment. The tank gauging operations shown in the various blocks in FIG. 1 can be performed with respect to a tank such as the tank 200, which is depicted in FIG. 2 and discussed in greater detail further below.

As indicated at block 102 in FIG. 1, a step or operation can be implemented for product pressure measurement using, for example one or more differential pressure sensors. Furthermore, as depicted at block 104, a step or operation can be implemented for product level measurement. This operation may be performed using, for example, a servo device or an automatic tank gauge (ATG). A non-limiting example of a servo device is the 954 SmartServo FlexLine device from Honeywell International Inc. A non-limiting example of an ATG is the 990 SmartRadar FlexLine product from Honeywell International Inc.

As indicated at block 106, a step or operation can be implemented to determine density. This operation may be performed through lab analysis and can be reported with respect to a reference temperature. As shown at block 108, a step or operation can be implemented to measure the temperature of the product. This operation can be performed, for example, using a temperature sensing device/system, such as, for example, the VITO temperature products available from Honeywell International Inc.

The pressure measurement data determined, as shown at block 102, can be used for mass calculations as depicted at block 110 involving calculation of the mass in the tank. The mass calculations shown at block 110 can also involve data obtained from a tank table, as shown at block 112. A tank table is a data file which comes from or relates to the calibration of the tank. Note that the tank table can also be used for Total Observed Volume (TOV) calculations as indicated at block 114. That is, the operation depicted at block 114 can involve TOV calculations including calculating the observed volume in the tank.

The operation depicted at block 114 can also incorporate the use of the data resulting from the operation shown at block 104 involving product level measurement data (e.g., level of liquid in the tank). The TOV calculations performed as shown at block 114 can thus involve the use of the tank table together with the product level measurement data for use in the TOV calculations. The results from the operation performed at block 114 can then be used with the mass calculation operation (i.e., calculating the mass in the tank) indicated at block 116. That is, the operation shown at block 116 also involves calculating mass in the tank.

The density measurement data obtained from the density operation depicted at block 106 and the temperature measurement data resulting from the temperature measurement data shown at block 108 can be used for CTL calculations, as shown at block 118. The CTL calculations depicted at block 118 involves calculating the actual density from the reference density. These CTL calculations also incorporate data obtained from a product selection operation, as shown at block 120. The operation indicated at block 120 can be implemented by settings that are made in the system (e.g., tank gauging system). Note that results of the CTL calculations can be used as part of the mass calculation operation depicted at block 116.

In the context of tank gauging, a CTL calculation refers to the computation of a Corrected Tank Level (CTL). The Corrected Tank Level is an important parameter used to determine a precise volume of liquid contained within a storage tank, accounting for variations in temperature, pressure, and other factors that can affect the measured level.

Tank gauging systems such as the tank gauging system 200 shown in FIG. 2 typically rely on instruments such as level sensors, temperature sensors, and pressure sensors to monitor and measure the tank's liquid level. However, these measurements may be affected by environmental conditions, such as temperature changes, which can cause the liquid volume to expand or contract.

To accurately calculate the volume of liquid, the measured tank level needs to be corrected or adjusted based on factors like temperature and pressure. This is where CTL calculations come into play. The CTL calculation takes into account the specific characteristics of the liquid being stored, including its coefficient of thermal expansion and compressibility, to compensate for changes in temperature and pressure.

The formula for CTL calculation may vary depending on the specific tank gauging system and the parameters being considered. Typically, it involves applying correction factors to the measured tank level based on the current temperature and pressure conditions. By adjusting the measured level using the appropriate correction factors, the CTL provides an accurate representation of the liquid volume within the tank, accounting for the effects of temperature and pressure variations.

A CTL calculation is important in industries where precise measurement of liquid volumes is essential, such as oil and gas, chemical manufacturing, and storage terminals. Accurate volume calculations are important for inventory management, custody transfer operations, and compliance with regulations. By accounting for temperature and pressure effects and other parameters, the CTL calculations as depicted at block 118 can help ensure accurate and reliable tank gauging measurements and improve overall operational efficiency.

Results from the mass calculations performed as shown at blocks 110 and 116 can be compared as indicated at decision block 122. That is, the operation shown at block 122 can involve a comparison of two independent measurement principles and a test of whether or not the two numbers are within a required uncertainty from one another. If the answer is "No" then as depicted at block 124, a step or operation can be implemented to report a service issues. For example, a report can be generated that the system is too much out of a range accuracy or, for example, manual inputs may have been entered incorrectly. If, however, the answer is "Yes" with respect to decision block 122, then as shown at block 126, a step or operation can be implemented to report the tank mass.

The methodology shown in FIG. 1 incorporates aspects of both Hybrid Inventory Measurement Systems (HIMS) and level gauging systems. For example, the use of the pressure measurement operation via one or more "smart" pressure transmitters including, but not limited to differential pressure sensors associated with such smart pressure transmitters, with respect to the pressure measurement operation shown at block 102 and the tank table operation depicted at block 112 along with the TOV calculations described herein with respect to block 114 are aspects of a hybrid level system such as the HIMS. Note that the HIMS can be used to measure level by means of any automatic tank gauging (ATG) device, and/or volume by pressure sensor and density. The HIMS, however, can utilize level measurement equipment, and a 'smart' pressure transmitter and a temperature measurement device, which can allow the volume to be calculated very accurately. The approach shown in FIG. 1 can also include the use of level gauging systems and technologies, such as shown at block 104 and discussed herein.

The method 100 shown in FIG. 1 can operate with the advantage of a hydrostatic level gauging system and a level gauging system combined. For a level measurement system, the density and product temperature may be required separately. The HIMS system can automatically measure this level. In most cases, however, the HIMS system may not measure, for example, a Pressure 2 sensor location. However, a level system such as that described with respect to block 104 in FIG. 1 can measure to the bottom of the tank.

This combined system can therefore measure all date required for the mass calculations shown at blocks 110 and 116 and can measure to the bottom of the tank. Furthermore, data is coming from two independent systems as shown in FIG. 1 which can increase reliability. These two independent systems are generally divided, as shown in FIG. 1, between the pressure measurement operation depicted at block 102 and the product level measurement operation, the density measurement operation and the temperature measurement operation as shown respectively at blocks 104, 106, and 108.

FIG. 2 illustrates a schematic diagram of a tank gauging system 200, which can be adapted for use in accordance with an embodiment. It should be appreciated that the tank gauging system 200 shown in FIG. 2 represents one possible tank gauging system, which may be utilized to implement one or more embodiments. Other types of tang gauging systems and components may be implemented in the context of different/alternative embodiments.

The tank gauging system 200 can be used to measure conditions (e.g., level, density, etc.) in a tank 202 with a product 214 therein. The tank 202 is not necessarily part of the actual tank gauging system 200 but is illustrated herein for exemplary purposes only and to demonstrate one possible embodiment. The tank gauging system 200 can include one or more sensors such as, for example, a first pressure sensor 210, a second pressure sensor 208, and a third pressure sensor 206. The tank gauging system 200 can also include a level sensing device 204 and a stillpipe 205 that can extend downward into the product 214 contained in the tank 202. It should be appreciated the use of a stillpipe such as stillpipe 205 is not a requirement of the embodiments. Reference to the use of the stillipipe 205 herein is merely for illustrative purposes only. Other tank gauging systems may be implemented without the use of a stillpipe.

The level sensing device 204 shown in FIG. 2 may be, for example, a servo device or an automatic tank gauge (ATG) such as discussed above. One or more of the pressure sensors 210, 208 and 206 may be, for example, a differential pressure sensor such as discussed above as well.

Non-limiting example of pressure sensors 210, 208, and/or 206 include the STD800 SmartLine® Series differential pressure sensors available from Honeywell International. Examples of these differential pressure sensors including pressure transmitters are discussed in the non-limiting document entitled "SMARTLINE PRESSURE TRANSMITTERS Modular, Accurate and Robust for the Lowest Cost of Ownership," 2023, Honeywell International Inc, which is incorporated herein by reference in its entirety.

In the example tank gauging system 200 shown in FIG. 2, the example stillpipe 205 can be implemented as a vertical pipe or tube that can extend from the bottom of the tank 202 up to a certain height within the tank 202. A purpose of the illustrative stillpipe 205 is to provide an accurate measurement of the liquid level (e.g., level of the product 214) inside the tank 202.

The example stillpipe 205 can be designed in a manner that can dampen/reduce any disturbance or turbulence caused by the movement or flow of liquid within the tank 202. By extending the stillpipe 205 to a certain height, it ensures that the liquid/product entering the stillpipe 205 is calm and unaffected by any surface agitation or sloshing.

When measuring the liquid level in the tank 202, it is crucial to have a stable and consistent reading. Without the stillpipe 205, the level measurement may be influenced by factors such as wave motion, splashing, or the formation of foam on the liquid surface. These factors can introduce inaccuracies and inconsistencies in the readings, making it difficult to obtain reliable data.

The stillpipe 205 can create a calm zone or stilling well within the tank 202. It allows the liquid inside the pipe to settle down, giving an accurate representation of the liquid level in the tank 202. It effectively isolates the liquid column within the pipe from disturbances in the rest of the tank 202, providing a stable reference point for measuring the liquid level.

The tank gauging system 200 can utilize various methods to measure the liquid level accurately, such as float and tape systems, ultrasonic sensors, or radar level transmitters etc. Regardless of the measurement technology used, incorporating the stillpipe 205 can ensure that the readings obtained are consistent and reliable by minimizing the impact of surface disturbances.

Figure 3:
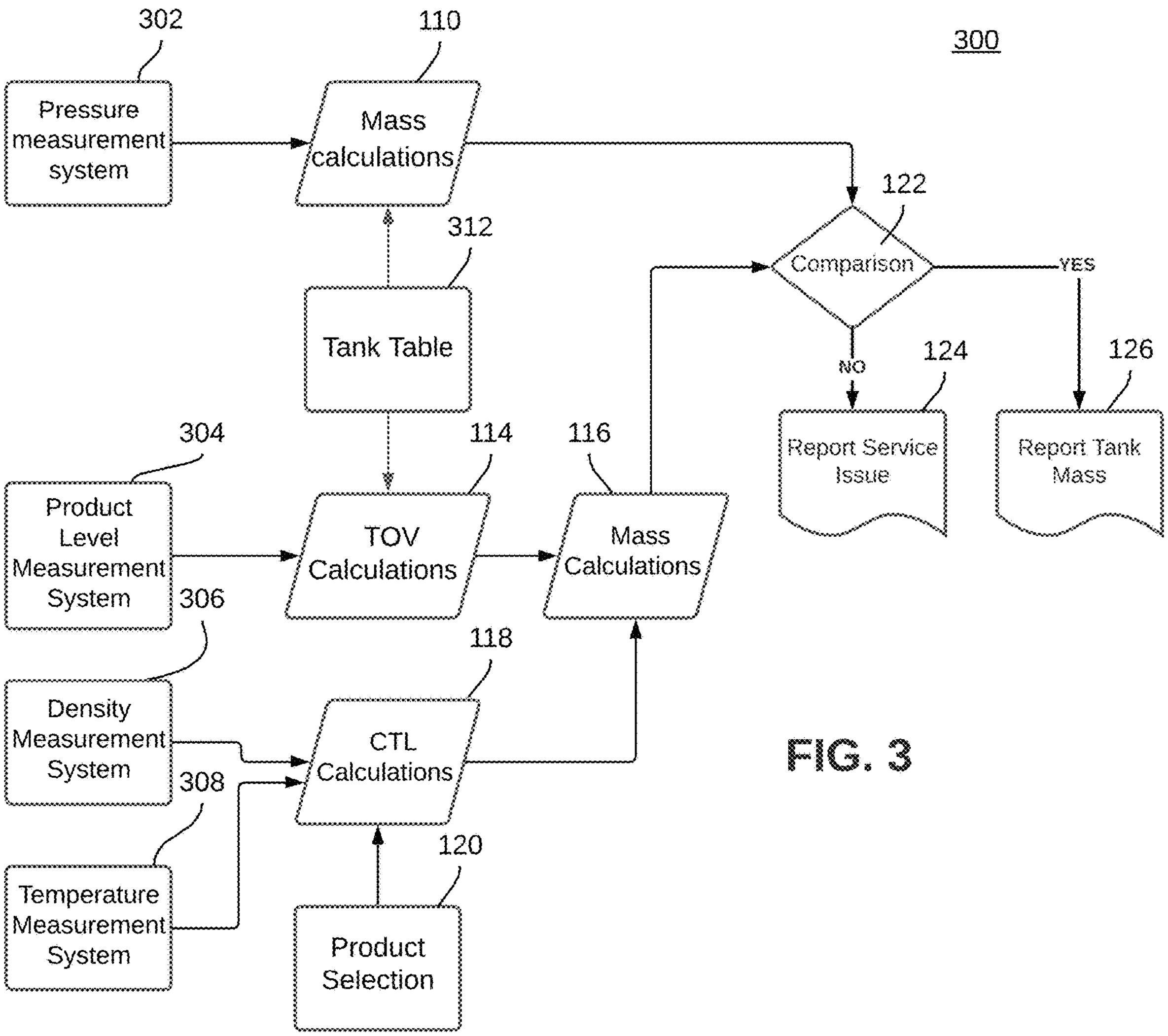
FIG. 3 illustrates a schematic diagram of a tank gauging system, which can be implemented in accordance with an alternative embodiment.

FIG. 3 illustrates a schematic diagram of a tank gauging system 300, which can be implemented in accordance with an embodiment. Note that the tank gauging system 300 can operate according to the various operations shown in FIG. 1. FIG. 3 includes many of the same operations. However, FIG. 3 is shown in the context of a system that can be configured to include one or more measurement/system systems such as a pressure measurement system 302, a product level measurement system 304, a density measurement system 306, and a temperature measurement system 308. In the interest of brevity, each and every operation shown at the various other blocks will not be described again (i.e., see FIG. 1 for details of those operations).

The pressure measurement system 302 can perform the operations previously described with respect to block 102 in FIG. 1. The product level measurement system 304 can perform the operations previously described herein with respect to block 104 in FIG. 1. The density measurement system 306 can perform the operations previously discussed herein with respect to block 106 in FIG. 1. Furthermore, the temperature measurement system 308 can perform the operations discussed herein with respect to block 108 in FIG. 1.

The data obtained from the multiple sensors (i.e., pressure measurement sensor 302, product level measurement system 304, density measurement system 306, temperature measurement system 308) can be combined to increase accuracy and provide a more complete dataset. For tank gauging, the mass of the tank inventory is relevant. Hence, the use of the tank table operations shown at block 312. A level measurement system therefore can require separate temperature and density data as obtained respectively from the temperature measurement system 308 and the density measurement system 306. Density data is typically a manual measurement and requires lab analysis. But a level measurement system can measure from top to bottom.

A system based on hydrostatic pressure can directly measures m and does not require separate temperature and density measurements. In addition, a second pressure sensor or a level gauge can be combined with a main pressure sensor to also provide data related to density and level. A disadvantage is that a hydrostatic measurement system cannot measure below the main pressure sensor height. But the level system discussed herein can solve this disadvantage. Thus, the HIMS system can provide an observed density to the level system. Therefore, the level system does not need a reference density and temperature anymore. With the data from the HIMS system, the level system can measure the complete content of the tank from top to bottom.

Additionally, because of the two different measurement methods as discussed herein, the consistency between the two systems can be monitored and alarms can be created if the deviation between the two systems become too large. This increases the reliability.

Based on the foregoing, it can be appreciated that a number of embodiments including preferred and alternative embodiments are disclosed herein. For example, in an embodiment, a method for tank gauging can involve: calculating a first mass of a product in a tank using data indicative of a first condition and calculating a second mass of the product in the tank using data indicative of a second condition, wherein the data indicative of the first condition is collected independently of the data indicative of the second condition; and reporting a tank mass of the product in the tank based on a comparison of the first mass to the second mass.

In an embodiment, the step or operation of reporting the tank mass of the product in the tank based on the comparison of the first mass to the second mass, can further involve reporting the tank mass when a result of the comparison is within a required uncertainty between the first mass and the second mass.

An embodiment can also involve comprising reporting a service issue when a result of the comparison is not within a required uncertainty between the first mass and the second mass.

In an embodiment, the data indicative of a first condition of the product in the tank can include pressure (i.e., pressure data).

In an embodiment, the indicative of a first condition of the product in the tank can comprise hydrostatic pressure data.

In an embodiment, the data indicative of a first condition of the product in the tank comprises data indicative of a level of the product in the tank.

In an embodiment, the indicative of a first condition of the product in the tank can comprises one or more of: density and temperature.

An embodiment can further involve: measuring the first condition in the tank using a first sensor and providing data indicative of the first condition from the first sensor; and measuring the second condition in the tank using a second sensor that is independent of the first sensor, wherein the second sensor provides data indicative of the second condition.

In an embodiment, the first sensor can comprise a hydrostatic pressure sensor.

In an embodiment, the second sensor can comprise a level sensor for measuring a level of the product in the tank.

In an embodiment, the first mass can be calculated based on data obtained from a Hybrid Inventory Measurement System (HIMS) and the second mass can be calculated based on data obtained from a level gauging system.

In an embodiment, a system for tank gauging can include at least one processor; and a non-transitory computer-usable medium embodying computer program code, the computer-usable medium capable of communicating with the at least one processor. The computer program code can include instructions executable by the at least one processor and configured for: calculating a first mass of a product in a tank using data indicative of a first condition and calculating a second mass of the product in the tank using data indicative of a second condition, wherein the data indicative of the first condition is collected independently of the data indicative of the second condition; and reporting a tank mass of the product in the tank based on a comparison of the first mass to the second mass.

In an embodiment, the instructions for reporting the tank mass of the product in the tank based on the comparison of the first mass to the second mass, can be further configured for: reporting the tank mass when a result of the comparison is within a required uncertainty between the first mass and the second mass.

In an embodiment, the instructions for reporting a tank mass of the product in the tank based on a comparison of the first mass to the second mass, can further comprise instructions configured for: reporting a service issue when a result of the comparison is not within a required uncertainty between the first mass and the second mass.

In an embodiment, the data indicative of a first condition of the product in the tank can comprise one or more of: a pressure, a level of the product in the tank, a density, and a temperature.

In an embodiment, the instructions can be further configured for: measuring the first condition in the tank using a first sensor and providing data indicative of the first condition from the first sensor; and measuring the second condition in the tank using a second sensor that is independent of the first sensor, wherein the second sensor provides data indicative of the second condition.

In an embodiment, the first mass can be calculated based on data obtained from a Hybrid Inventory Measurement System (HIMS) and the second mass can be calculated based on data obtained from a level gauging system.

In an embodiment, a tank gauging apparatus can include: a plurality of sensors that measure at least one of: a first condition and a second condition, wherein a first mass of a product in a tank is calculated using data indicative of the first condition and a second mass of the product in the tank is calculated using data indicative of the second condition, and wherein the data indicative of the first condition is collected independently of the data indicative of the second condition, and wherein a tank mass of the product in the tank is reported based on a comparison of the first mass to the second mass.

In an embodiment, the tank mass can be reported when a result of the comparison is within a required uncertainty between the first mass and the second mass.

In an embodiment, a service issue can be reported when a result of the comparison is not within a required uncertainty between the first mass and the second mass.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for tank gauging, comprising:

measuring a first condition of a product in a tank using a pressure sensor and providing first data indicative of the first condition from the pressure sensor;

measuring a second condition of the product in the tank using a level sensor that is independent of the pressure sensor and providing second data indicative of the second condition from the level sensor, wherein the second condition comprises a level of the product in the tank, and wherein the level sensor is associated with a stillpipe that extends downward into the product contained in the tank, and wherein the stillpipe creates a calm zone within the tank, allows liquid inside the stillpipe to settle down, and gives an accurate representation of liquid level in the tank;

calculating a first mass of the product in the tank using the first data and calculating a second mass of the product in the tank using the second data, wherein the the first mass is calculated based on data obtained from a Hybrid Inventory Measurement System (HIMS) and the second mass is calculated based on data obtained from a level gauging system, and wherein the first data is collected independently of the second data; and reporting a tank mass of the product in the tank based on a comparison of the first mass to the second mass.

2. The method of claim 1 wherein reporting the tank mass of the product in the tank based on the comparison of the first mass to the second mass, further comprises:

reporting the tank mass when a result of the comparison is within a required uncertainty between the first mass and the second mass.

3. The method of claim 1 further comprising reporting a service issue when a result of the comparison is not within a required uncertainty between the first mass and the second mass.

4. The method of claim 1 wherein the pressure sensor comprises a hydrostatic pressure sensor.

5. The method of claim 1 further comprising determining at least one of density and temperature of the product, wherein the at least one of density and temperature is used in calculating the second mass.

6. A system for tank gauging, comprising:

at least one processor; and a non-transitory computer-usable medium embodying computer program code, the computer-usable medium capable of communicating with the at least one processor;

a pressure sensor configured to measure a first condition of a product in a tank and to provide first data indicative of the first condition;

a level sensor configured to measure a second condition of the product in the tank and to provide second data indicative of the second condition, wherein the second condition comprises a level of the product in the tank; and a stillpipe associated with the level sensor and extending downward into the product contained in the tank, the stillpipe configured to create a calm zone within the tank, to allow liquid inside the stillpipe to settle down, and to give an accurate representation of liquid level in the tank, wherein the computer program code comprises instructions executable by the at least one processor and configured for:

calculating a first mass of the product in the tank using the first data, wherein the first mass is calculated based on data obtained from a Hybrid Inventory Measurement System (HIMS);

calculating a second mass of the product in the tank using the second data, wherein the second mass is calculated based on data obtained from a level gauging system, and wherein the first data is collected independently of the second data; and reporting a tank mass of the product in the tank based on a comparison of the first mass to the second mass.

7. The system of claim 6 wherein the instructions for reporting the tank mass of the product in the tank based on the comparison of the first mass to the second mass, are further configured for:

reporting the tank mass when a result of the comparison is within a required uncertainty between the first mass and the second mass.

8. The system of claim 6 wherein the instructions for reporting a tank mass of the product in the tank based on a comparison of the first mass to the second mass, further comprise instructions configured for:

reporting a service issue when a result of the comparison is not within a required uncertainty between the first mass and the second mass.

9. The system of claim 6 wherein the computer program code is further configured to receive at least one of density data and temperature data and to use the at least one of density data and temperature data in calculating the second mass.

10. A tank gauging apparatus, comprising:

a pressure sensor configured to measure a first condition of a product in a tank and to provide first data indicative of the first condition;

a level sensor configured to measure a second condition of the product in the tank and to provide second data indicative of the second condition, wherein the second condition comprises a level of the product in the tank;

a stillpipe associated with the level sensor and extending downward into the product contained in the tank, the stillpipe configured to create a calm zone within the tank, to allow liquid inside the stillpipe to settle down, and to give an accurate representation of liquid level in the tank;

a processor configured to calculate a first mass of the product in the tank using the first data and to calculate a second mass of the product in the tank using the second data, wherein the first mass is calculated based on data obtained from a Hybrid Inventory Measurement System (HIMS) and the second mass is calculated based on data obtained from a level gauging system, and wherein the first data is collected independently of the second data, and wherein a tank mass of the product in the tank is reported based on a comparison of the first mass to the second mass.

11. The tank gauging apparatus of claim 10 wherein the tank mass is reported when a result of the comparison is within a required uncertainty between the first mass and the second mass.

12. The tank gauging apparatus of claim 10 wherein a service issue is reported when a result of the comparison is not within a required uncertainty between the first mass and the second mass.

* * * * *